(12) United States Patent
Porfido et al.

(10) Patent No.: US 8,652,605 B2
(45) Date of Patent: Feb. 18, 2014

(54) METHOD FOR PRODUCING A TUBULAR HOLLOW BODY, AND TUBULAR HOLLOW BODY

(75) Inventors: Erasmo Porfido, Stetten (CH); Peter Heer, Lottstetten (DE); Markus Breyer, Radolfzell (DE)

(73) Assignee: Georg Fischer JRG AG, Sissach (CH)

( * ) Notice: Subject to any disclaimer, the term of this patent is extended or adjusted under 35 U.S.C. 154(b) by 1017 days.

(21) Appl. No.: 12/718,727

(22) Filed: Mar. 5, 2010

(65) Prior Publication Data

US 2010/0227096 A1  Sep. 9, 2010

(30) Foreign Application Priority Data

Mar. 9, 2009 (EP) ..................................... 09003362

(51) Int. Cl.
*B29C 47/00* (2006.01)
(52) U.S. Cl.
USPC .......... 428/36.9; 138/177; 138/178; 138/111; 285/131.1; 285/132.1
(58) Field of Classification Search
USPC .......... 428/36.9; 138/177, 178, 111, DIG. 11; 285/131.1, 132.1
See application file for complete search history.

(56) References Cited

U.S. PATENT DOCUMENTS

| 587,902 | A | * | 8/1897 | Wilson | 137/334 |
|---|---|---|---|---|---|
| 2,449,754 | A | * | 9/1948 | Seitz | 285/4 |
| 3,425,456 | A |  | 2/1969 | Schibig |  |
| 3,588,920 | A | * | 6/1971 | Wesolowski | 623/1.54 |
| 4,467,002 | A | * | 8/1984 | Crofts | 428/34.9 |
| 4,557,261 | A | * | 12/1985 | Ru/ gheimer | 604/533 |
| 4,830,060 | A | * | 5/1989 | Botsolas | 138/149 |
| 4,992,626 | A | * | 2/1991 | Monroe | 174/36 |
| 5,250,041 | A | * | 10/1993 | Folden et al. | 604/284 |
| 5,627,159 | A | * | 5/1997 | Shih et al. | 514/44 R |
| 5,672,159 | A | * | 9/1997 | Warrick | 604/179 |
| 5,857,715 | A | * | 1/1999 | Gray et al. | 285/131.1 |

FOREIGN PATENT DOCUMENTS

EP  0333086 A3  9/1989

* cited by examiner

*Primary Examiner* — N. Edwards
(74) *Attorney, Agent, or Firm* — Bachman & LaPointe, P.C.

(57) ABSTRACT

The invention relates to a method for producing a tubular hollow body (1) with at least three pipe openings, partly or completely consisting of plastics material. It is provided that a lost core pipe (9), which has a connection opening (13, 14) on each of its ends and has at least one docking opening (11) along its length, is produced, that the core pipe (9) is introduced into a cavity of a mould, with two non-lost core pieces (17, 18) being arranged with one of their ends (3, 4) respectively against the connection openings (13, 14) in a sealing manner and a non-lost core part (19) being arranged with one end against the docking opening (11) in a sealing manner, in that plastics material (25) is then introduced into the mould cavity to encapsulate the core pipe (9), the core pieces (17, 18) and the core part (19) and that, once the plastics material (25) has cured, the core pieces (17, 18) and the core part (19) are withdrawn from the hollow body (1) created. The invention also relates to a corresponding hollow body (1).

1 Claim, 3 Drawing Sheets

METHOD FOR PRODUCING A TUBULAR HOLLOW BODY, AND TUBULAR HOLLOW BODY

BACKGROUND OF THE INVENTION

The invention relates to a method for producing a tubular hollow body with at least three pipe openings, partly or completely consisting of plastics material.

It is known for tubular hollow bodies that are formed as forked pipes and are in each case of an approximately Y shape to be put together from two prefabricated half shells. It is also known in the production of a tubular hollow body for all the cavities to be formed by prefabricated pipe parts, then the pipe parts to be put together and the entire assembly encapsulated with plastics material. In this regard, see for example, EP 0 333 086 A3 and U.S. Ser. No. 3,425,456.

The invention is based on the object of providing a method for producing a tubular hollow body that requires little effort and preparation and nevertheless makes it possible to produce hollow bodies of high precision and great strength.

SUMMARY OF THE INVENTION

For this purpose, it is provided according to the invention to produce a lost core pipe, which has a connection opening at each of its ends and has at least one docking opening along its length, the core pipe being introduced into a cavity of a mould and two non-lost core pieces being arranged with one of their ends respectively against the connection openings in a sealing manner and a non-lost core part being arranged with one end against the docking opening in a sealing manner, plastics material then being introduced into the mould cavity to encapsulate the core pipe, the core pieces and the pipe part and, once the plastics material has cured, the core pieces and the core part are withdrawn from the hollow body created. Accordingly, all that is required for the production of the tubular hollow body is for the lost core pipe to be produced in advance. After that, the core pieces that subsequently form cavities in the component encapsulated with plastics material that communicate with the space inside the core pipe are arranged at the ends of said core pipe. The same applies correspondingly to the non-lost core part, which is arranged against the docking opening in a sealing manner, so that here too a communicating connection with the space inside the core pipe is created after the core part is withdrawn. The arrangement of the parts preferably takes place in such a way that the longitudinal extends of the two core pieces and the core part run transversely, in particular perpendicularly, in relation to the longitudinal extent of the core pipe, so that the hollow body is given the form of a forked pipe. If more than one docking opening is provided, each docking opening is assigned a core part and in this way a hollow body that is shaped in a form differing from a Y shape is formed.

According to a development of the invention, it is provided that, after the core pipe, the core pieces and the core part have been introduced, the mould is closed. "Introduced" is also to be understood as meaning that the core pieces and the core part are not inserted in the mould but are pushed into the mould cavity—because they are displaceable elements of the mould. All the elements mentioned are accordingly introduced into the open mould and the mould is subsequently closed. After that, the encapsulation with plastics material can take place. Once the plastics material has cured, the core pieces and the core part can be withdrawn from the moulding. The mould is subsequently opened.

According to a development of the invention, it is provided that a mould which has the core pieces and the core part as displaceable elements is used. Alternatively, it would be possible for the core pieces and the core part not to be component parts of the mould but to be inserted in it.

The invention also relates to a tubular hollow body, which is formed in particular as a forked pipe, preferably produced by the method mentioned above, with a manifold pipe, from each of the ends of which there extends a branch pipe, and with a connection pipe, which extends from the manifold pipe—seen along the length thereof—, the manifold pipe being a core pipe which is at least partly embedded in plastics material cured after being supplied and the branch pipes and/or the connection pipe being formed from the supplied plastics material. In the case of the hollow body according to the invention, the manifold pipe or core pipe at least partly embedded in the cured plastics material is accordingly a prefabricated pipe. The branch pipes and/or the connection pipe are subsequently produced by the plastics injection-moulding technique and thereby connected in a communicating manner to the prefabricated manifold pipe.

According to a development of the invention, it is provided that the manifold pipe runs transversely, in particular at right angles, in relation to the branch pipes and/or to the connection pipe.

Furthermore, it is advantageous if the branch pipes and/or if the connection pipe are/is formed by core pieces withdrawn from the plastics material or by a core part withdrawn from the plastics material. The core pieces or the core part may be solid material parts, in particular steel parts. They do not have to be of a tubular shape, because they are encapsulated with plastics material, whereby pipe parts of the tubular hollow body are created.

Finally, it is advantageous if the hollow body is formed as a plastics injection-moulded part with the manifold pipe as an insert part.

BRIEF DESCRIPTION OF THE DRAWINGS

The drawings illustrate the invention on the basis of an exemplary embodiment, to be precise.

DETAILED DESCRIPTION

Figure 1:
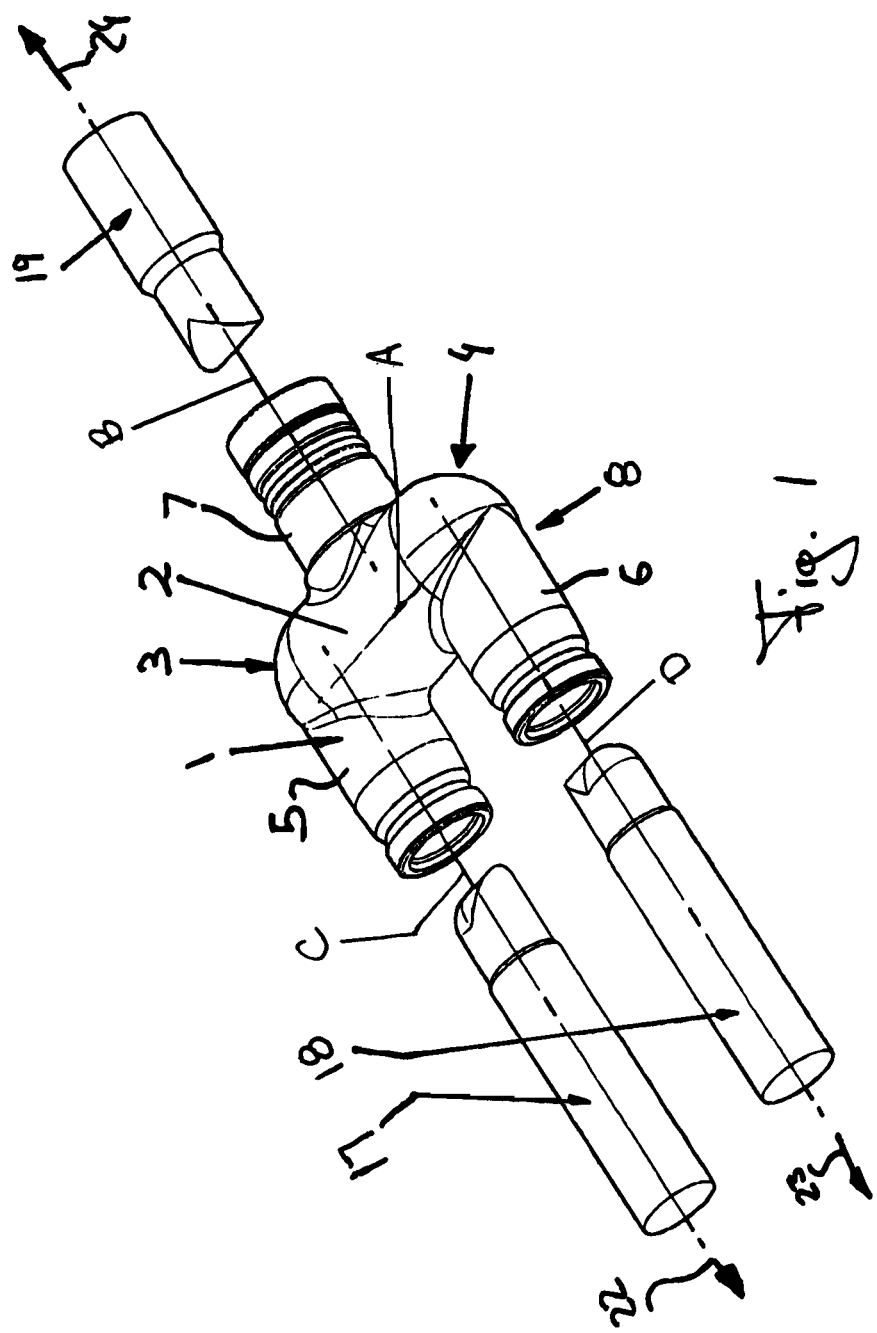
FIG. 1 shows a perspective view of a produced tubular hollow body, with core pieces withdrawn from it and a withdrawn core part.

FIG. 1 shows a tubular hollow body 1, which has a manifold pipe 2 extending along axis A, from each of the ends 3, 4 of which there extends branch pipes 5, 6 along axes C and D, and which has a connection pipe 7, which extends along axis B from the manifold pipe 2—seen along the length thereof. Altogether, the tubular hollow body 1 is formed as a so-called forked pipe 8, which is of an approximately Y shape, the branch pipes 5 and 6 running at right angles in relation to the manifold pipe 2. Furthermore, the connection pipe 7 likewise runs at right angles in relation to the manifold pipe 2, the two free ends of the branch pipes 5 and 6 pointing in a direction opposite to that of the free end of the connection pipe 7. By means of such a forked pipe 8, liquid distributing tasks can be solved, for example when supplying drinking water. If, for example, drinking water is introduced by way of the connection pipe 7, it enters the manifold pipe 2 and divides between branch pipe 5 and branch pipe 6.

Figure 2:
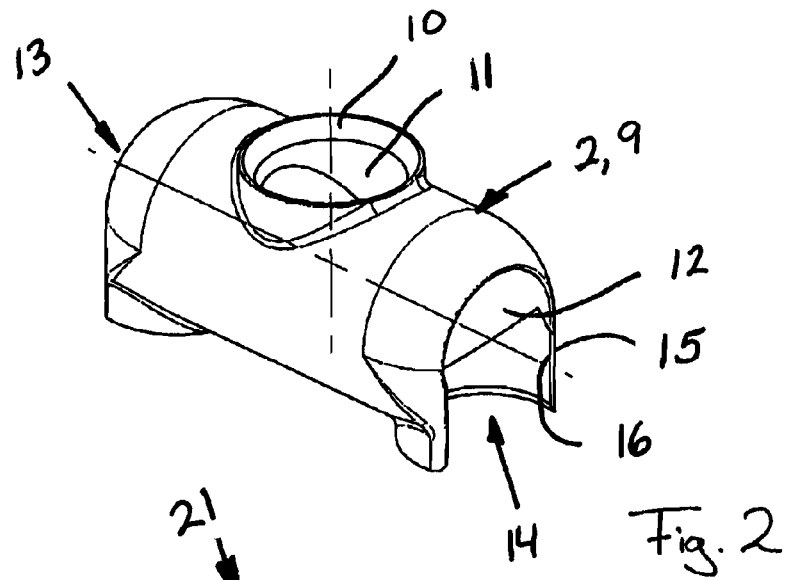
FIG. 2 shows a perspective view of a lost core pipe which is embedded in the hollow body of FIG. 1.

In order to produce such a tubular hollow body 1, the following procedure—according to FIGS. 2 to 5—is adopted. First of all, in a first production step, the manifold pipe 2 according to FIG. 2 is produced. The manifold pipe 2 is a lost core pipe 9, which is produced as a plastics pipe in a mould. PPSU (polyphenylsulphone) is used for example as the plastics material. According to FIG. 2, the core pipe 9 has a collar 10, which surrounds a docking opening 11, which opens out into a cavity 12 of the core pipe 9. Furthermore, the core pipe 9 has at each of its ends a connection opening 13, 14, which in each case has a substantially U-shaped rim 15 and an adjoining, likewise U-shaped rim 16, the two U rims being positioned at an angle, preferably at 90°, in relation to each other.

When the tubular hollow body 1 according to FIG. 1 is produced, the core pipe 9 according to FIG. 2 is inserted into a mould (not represented). This mould has two movable, non-lost core pieces 17, 18 and a movable, non-lost core part 19 (in this respect, see FIGS. 1 and 3). According to FIG. 3, the two core pieces 17 and 18 are fed to the core pipe 9 inserted in the mould, in a way corresponding to arrow 20, such that they close the connection openings 13 and 14 in a sealing manner with their front end regions. The core part 19 of the mould is fed to the core pipe 9, in a way corresponding to arrow 21, such that it closes the docking opening 11 in a sealing manner with its front end region.

Figure 3:
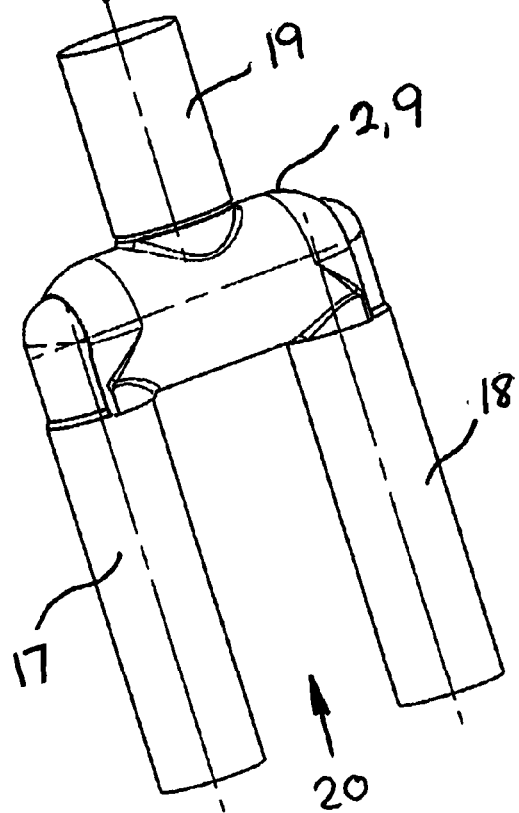
FIG. 3 shows a partial view of the core pipe as well as the core pieces arranged on the core pipe in a sealing manner and the core part arranged in a sealing manner.
Figure 4:
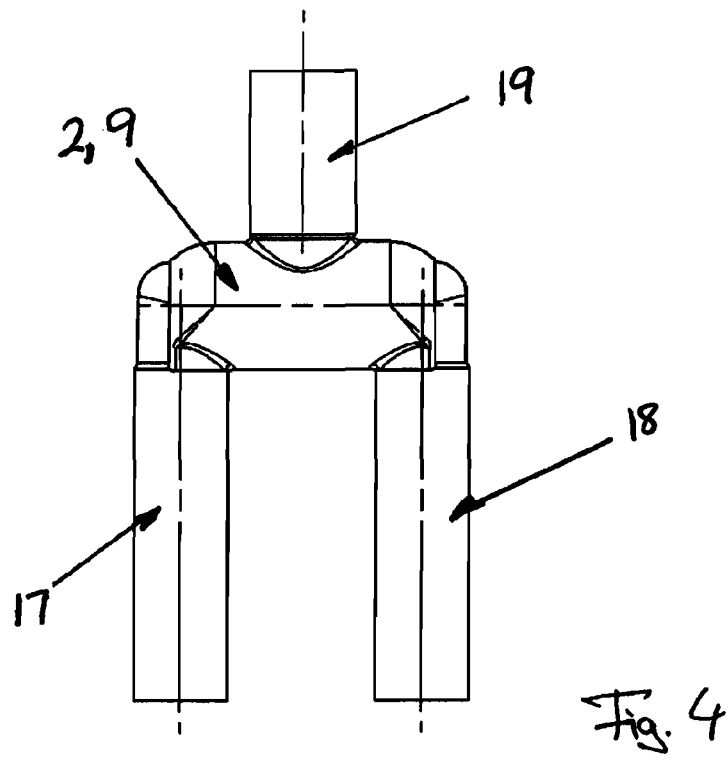
FIG. 4 shows a plan view of the arrangement of FIG. 3.

Then, the mould which contains the arrangement according to FIG. 3 is closed. At that time, uncured plastics material is introduced into the mould cavity in such a way that the core pipe 9, the core pieces 17 and 18 and the core part 19 are encapsulated with plastics material, in particular with PPSU. In this way, the hollow body 1 is given its final form. The cavity of the mould is designed in such a way that—according to FIG. 1—corresponding diameters, grooves, undercuts and so on, as are individually desired, are formed on the hollow body 1. Once the injected plastics material has cured, the two core pieces 17 and 18 are withdrawn from the cavity of the mould (not represented), according to arrows 22 and 23 in FIG. 1. The same applies correspondingly to the core part 19, which is withdrawn according to arrow 24. It follows from all of this that the prefabricated manifold pipe 2 represents an embedded core pipe 9 and that the other regions of the tubular hollow body 2 are produced by encapsulation of the core pieces 17 and 18 and of the core part 19 with plastics material, in particular with PPSU.

Figure 5:
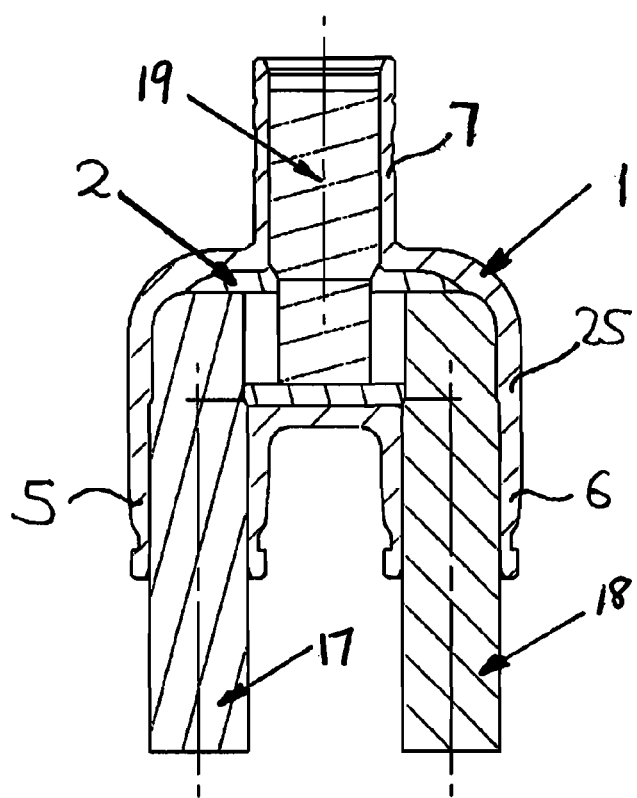
FIG. 5 shows the fully produced tubular hollow body in section, with not yet withdrawn core pieces and a not yet withdrawn core part.

FIG. 4 once again clearly illustrates how the arrangement within the mould looks when encapsulation with plastics material has not yet taken place. The manifold pipe 2 with core pieces 17 and 18 respectively arranged on it and core part 19 arranged on it can be seen. FIG. 5 shows the arrangement of FIG. 4 in cross section, but encapsulation with plastics material 25 has already taken place, so that the branch pipe 5 and the branch part 6 as well as the connection pipe 7 are already formed. The core pieces 17 and 18 and the core part 19 are still in the introduced state, that is to say they have not yet been removed.

The invention claimed is:

1. A tubular hollow body comprising:
a manifold which extends along an axis A to define a first end portion, a middle portion and a second end portion, the manifold having an inlet side and an outlet side, a first opening formed at the middle portion of the manifold on the inlet side of the manifold which receives a connection pipe which extends along an axis B substantially perpendicular to axis A, a second opening and a third opening formed at the first end portion and the second end portion of the manifold on the outlet side of the manifold, the second opening and third opening each receive a branch pipe which extend along axis C and axis D, respectively, wherein the axis C and axis D are substantially parallel to each other and to the axis A.

* * * * *